United States Patent
Koyama et al.

(10) Patent No.: US 7,558,422 B2
(45) Date of Patent: Jul. 7, 2009

(54) DOCUMENT PROCESSING APPARATUS

(75) Inventors: Toshiya Koyama, Kanagawa (JP); Teruka Saito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 639 days.

(21) Appl. No.: 10/775,242

(22) Filed: Feb. 11, 2004

(65) Prior Publication Data
US 2004/0223641 A1    Nov. 11, 2004

(30) Foreign Application Priority Data
Feb. 14, 2003    (JP)    ............................. 2003-037441

(51) Int. Cl.
*G06K 9/00*    (2006.01)
*G09G 5/02*    (2006.01)

(52) U.S. Cl. ........................ 382/162; 382/167; 345/589

(58) Field of Classification Search ................ 382/162, 382/167; 345/589
See application file for complete search history.

(56) References Cited

U.S. PATENT DOCUMENTS

| | | | | | |
|---|---|---|---|---|---|
| 6,128,407 | A | * | 10/2000 | Inoue et al. ................. | 382/167 |
| 6,591,008 | B1 | * | 7/2003 | Surve et al. ................. | 382/162 |
| 6,931,151 | B2 | * | 8/2005 | Weast ........................ | 382/162 |
| 7,054,483 | B2 | * | 5/2006 | Poynter ...................... | 382/162 |
| 7,124,375 | B1 | * | 10/2006 | Steele et al. ................ | 715/865 |
| 7,145,571 | B2 | * | 12/2006 | Jones et al. ................. | 345/589 |
| 7,394,468 | B2 | * | 7/2008 | Hofman et al. .............. | 345/589 |
| 2001/0053246 | A1 | * | 12/2001 | Tachibana et al. ........... | 382/162 |

FOREIGN PATENT DOCUMENTS

| | | |
|---|---|---|
| JP | A-63-282883 | 11/1988 |
| JP | A-10-149347 | 6/1998 |
| JP | A-2001-293926 | 10/2001 |
| JP | A 2002-044678 | 2/2002 |
| JP | A-2002-055671 | 2/2002 |

OTHER PUBLICATIONS

Meyer et al., "Color-Defective Vision and Computer Graphics Display", 1988, IEEE Computer Graphics & Applications, 28-40.*

(Continued)

*Primary Examiner*—Brian P Werner
*Assistant Examiner*—Katrina Fujita
(74) *Attorney, Agent, or Firm*—Oliff & Berridge, PLC

(57) ABSTRACT

A document processing apparatus has a control section. The control section determines that at least some of a plurality of colors contained in input document data are a determined color group, determines at least one set of confusion colors of the colors contained in the determined color group based on confusion color information defined in association with color blindness of a human being in a predetermined color component space, and performs predetermined process for portions of the colors contained in the determined confusion color set, in the input document data.

8 Claims, 12 Drawing Sheets

OTHER PUBLICATIONS

Takamura et al., "Constructing a Uniform Color Space for Visually Lossless Color Representation and Image Coding", 2001, IEEE International Conference on Image Processing, 918-921.*

Oleari, Claudio, "Uniform-Scale Chromaticity Diagrams: Opponent-Chromatic Responses as Logarithms of the Cone-Activation Ratios", 1998, John Wiley & Sons, Inc., vol. 23, Issue 1, 27-38.*

Takagi, Mikio et al. "Image Analysis Handbook." Tokyo University Shuppankai, $1^{st}$ Ed. Jan. 17, 1991.

Oota, Noboru. "Color Engineering." Tokyo Denki University Shuppankyoku, $1^{st}$ Ed. Dec. 20, 1993.

* cited by examiner

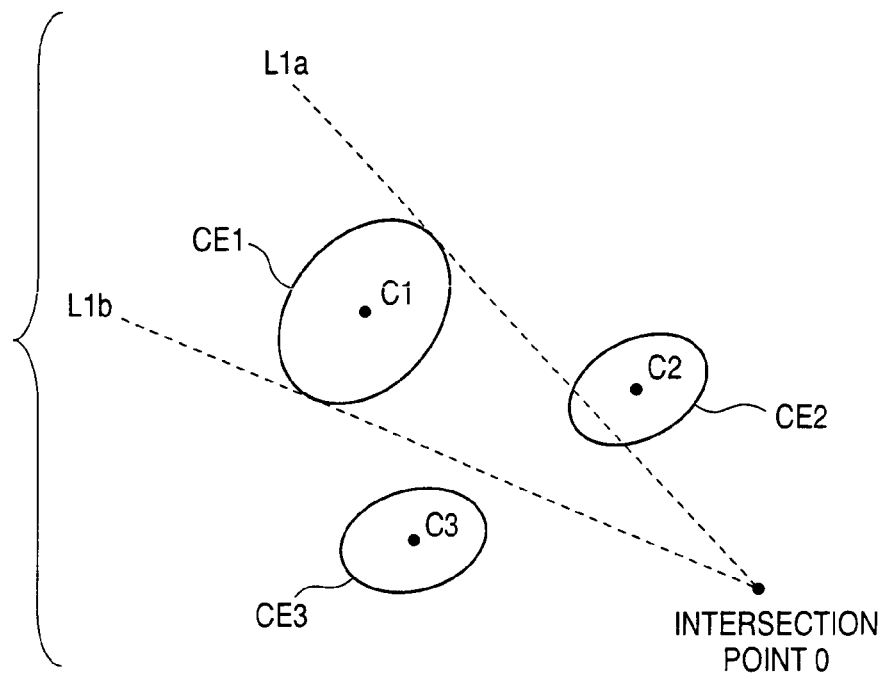
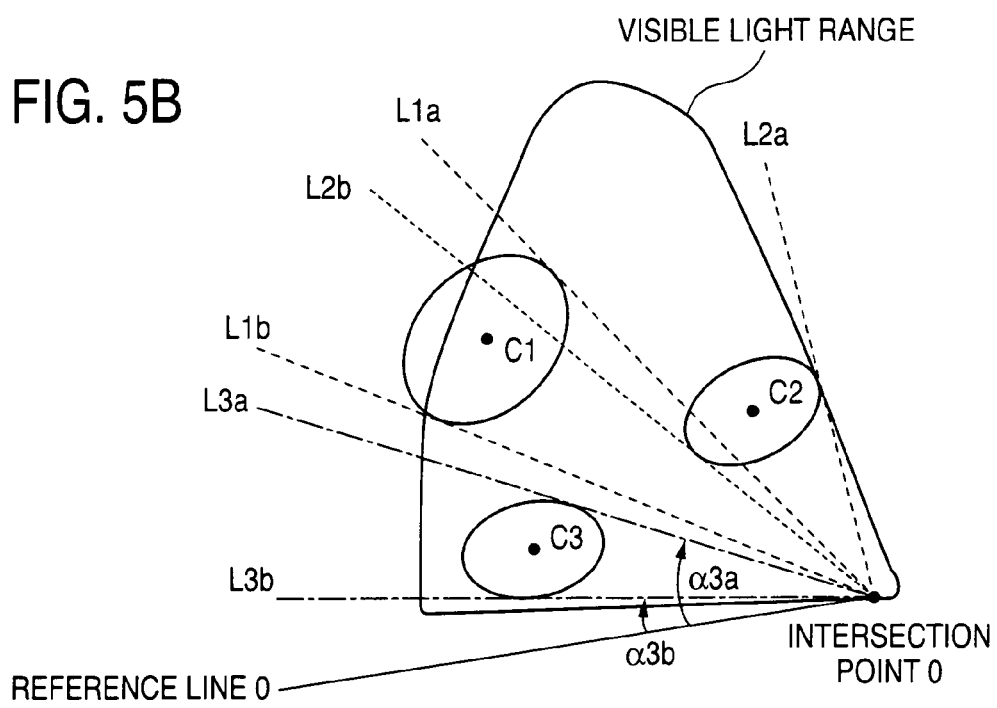

| COLOR INFORMATION | COUNTER VALUE |
|---|---|
| C1 | 2 |
| C2 | 1 |
| C3 | 0 |
| C4 | 1 |
| C5 | 0 |

DOCUMENT PROCESSING APPARATUS

BACKGROUND OF THE INVENTION

1. Field of the Invention

This invention relates to a document processing apparatus for adjusting document data so as to make a document easily visible to people with color blindness.

2. Description of the Related Art

People use various colors to classify or represent information for the purpose of easily understanding the information and enhancing visibility. For example, a traffic signal uses three colors of red, yellow, and blue to control traffic. In addition to such public departments, graphs, etc., as materials used in a company are colored by item for easy understanding using a color printer or a large number of colors are also used for background images of slides created using presentation software.

Such use of colors provides advantages for persons with normal color vision to easily understand information definitely. However, such use of colors does not necessarily lead to easy understanding for people with colorblindness. For example, for a person with color blindness who is hard to distinguish between red and green, a graph colored properly in red and green becomes hard to see.

According to physiological and medical studies concerning the color vision of a human being, it is known that there are three types of color blindness P, D, and T. The state of the color blindness can be better understood using the color component space represented by CIE XYZ color system xy chromaticity diagram defined from the viewpoint of physiological optics. That is, when lines (called confusion color lines or confusion color loci) are drawn radially from one point on the xy chromaticity diagram (which will be hereinafter called intersection point for convenience of the later description), if the colors on the same line (called confusion colors) have the same lightness, it is made impossible for persons with each type of color blindness to distinguish between the colors. The intersection point position varies depending on the type of color blindness (P, D, or T); the intersection point for P and that for D are positioned in the lower right part on the CIE chromaticity diagram and the intersection point for T is positioned in the lower left part. It is also known that defective color vision of T occurs comparatively rarely.

Then, if confusion colors are contiguous, an art is available for adjusting the luminance signal of the boundary between the confusion colors for making the boundary conspicuous, as described in JP-A-2002-44678.

SUMMARY OF THE INVENTION

However, if the boundary portion is made conspicuous as in the related art, the color code portion can be seen, but the person with color blindness cannot discriminate between color code and simple drawing of boundary line.

It also becomes difficult to distinguish between two colors in the proximity of a specific confusion color line although the colors are not strictly confusion colors. A distinguishable area if the color component changes even slightly and a hard-to-distinguish area even by a person with normal color vision although the color component considerably changes exist on the xy chromaticity diagram. Such areas are studies systematically, and it is known that color confusion occurs generally within an area known as "MacAdam ellipse" on the xy chromaticity diagram.

In the related art, however, confusion of colors actually caused by two colors not necessarily existing on the confusion color line is not considered.

It is therefore an object of the invention to provide a document processing apparatus also considering color confusion actually caused by two colors not necessarily existing on a confusion color line.

To solve the problems in the related art example, according to one aspect of the invention, there is provided a document processing apparatus including means for determining that at least some of a plurality of colors contained in input document data are a determined color group; and retrieval means for determining a set of confusion colors of the colors contained in the determined color group based on at least one piece of confusion color information defined in association with color blindness of a human being in a predetermined color component space, characterized in that predetermined processing is performed for portions of the colors contained in the confusion color set determined by the retrieval means, in the input document data.

When some of the colors in the determined color group are contained in a predetermined range defined in the proximity of one attention confusion color locus in a confusion color locus group defined so as to contain confusion colors in color blindness in the color component space, the retrieval means may determine some of the colors to be a confusion color set.

The retrieval means may define a nearby confusion area provided based on the color vision characteristics of a human being or the characteristics of an output medium in the predetermined color component space for each of the colors contained in the determined color group, and when one attention confusion color locus in a confusion color locus group defined so as to contain confusion colors in color blindness in the color component space passes through the inside of the defined nearby confusion area, the retrieval means may determine the colors contained in the nearby confusion area to be a confusion color set.

The retrieval means may define a nearby confusion area provided based on the color vision characteristics of a human being or the characteristics of an output medium in the predetermined color component space for each of the colors contained in the determined color group, and when one attention confusion color locus in a confusion color locus group defined so as to contain confusion colors in color blindness in the color component space passes through the inside of the defined nearby confusion area, the retrieval means may determine the colors contained in the nearby confusion area and colors in a predetermined area in the proximity of the attention confusion color locus to be a confusion color set.

The expression "the characteristics of an output medium" mentioned here is used to mean the characteristics of the output medium for outputting the document processed by the document processing apparatus, for example, the characteristics of print, display, etc. The information concerning the characteristics may be previously specified.

The retrieval means may determine which of blocks previously defined in the predetermined color component space each of the colors contained in the determined color group belongs to, and may determine a confusion color set of the colors contained in the determined color group based on block-to-block confusion color information associating blocks confused with each other in color blindness with each other in association with color blindness of a human being and information of the block to which each of the colors contained in the determined color group belongs to.

Further, the color component space may contain the lightness component of each of the colors contained in the determined color group and if attention color contained in one of the determined sets and another color contained in the set differ in lightness on the color vision characteristics of a human being, the retrieval means may remove the attention color from the set.

Further, the color component space may contain the lightness component of each of the colors contained in the determined color group, and the retrieval means may not determine whether or not the colors different in lightness on the color vision characteristics of a human being are confused with each other.

According to another aspect of the invention, there is provided a document processing method using a computer, including the steps of determining that at least some of a plurality of colors contained in input document data are a determined color group; and determining a set of confusion colors of the colors contained in the determined color group based on at least one piece of confusion color information defined in association with color blindness of a human being in a predetermined color component space, characterized in that predetermined processing is performed for portions of the colors contained in the confusion color set, in the input document data.

According to another aspect of the invention, there is provided a document processing program for causing a computer to execute the steps of determining that at least some of a plurality of colors contained in input document data are a determined color group; and determining a set of confusion colors of the colors contained in the determined color group based on at least one piece of confusion color information defined in association with color blindness of a human being in a predetermined color component space, and causing the computer to perform predetermined processing for portions of the colors contained in the confusion color set, in the input document data.

BRIEF DESCRIPTION OF THE DRAWING

These and other objects and advantages of this invention will become more fully apparent from the following detailed description taken with the accompanying drawings in which:

FIGS. 5A and 5B are schematic representations to represent examples of retrieval processing considering MacAdam ellipses;

DETAILED DESCRIPTION OF THE PREFERRED EMBODIMENTS

Figure 1:
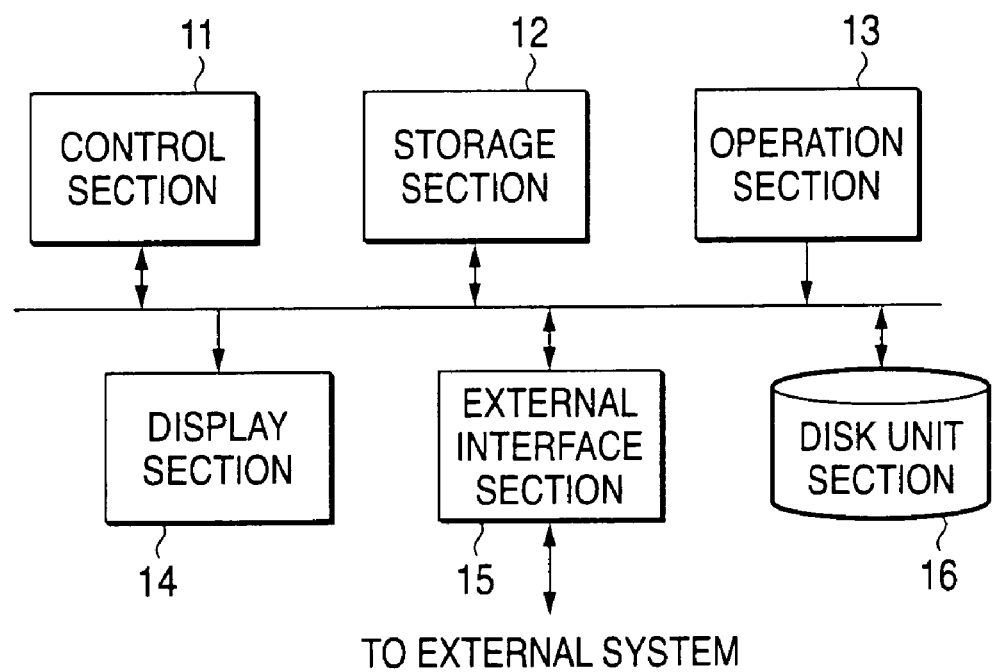
FIG. 1 is a block diagram to show the configuration of a document processing apparatus according to an embodiment of the invention.

Referring now to the accompanying drawings, there is shown a preferred embodiment of the invention. A document processing apparatus according to the embodiment of the invention is made up of a control section 11, a storage section 12, an operation section 13, a display section 14, an external interface section 15, and a disk unit section 16, as shown in FIG. 1. The control section 11 operates in accordance with a program stored in the storage section 12 and executes predetermined processing for document data input from the external interface section 15 and then outputs the processed document data. The specific description of the processing performed by the control section 11 will be given later in detail.

The storage section 12 stores the program executed by the control section 11. It also operates as work memory of the control section 11. The operation section 13 is a mouse, a keyboard, etc., for outputting command operation performed by the user to the control section 11. The display section 14 is a display, etc., for displaying a display image generated based on document data in accordance with a command input from the control section 11. For example, the control section 11 may send document data to an external system and cause the external system to generate a display image based on the document data and display the generated display image. The external interface section 15 outputs externally input document data to the control section 11.

The disk unit section 16 is, for example, a hard disk and receives and retains the program executed by the control section 11 from an external computer-readable storage medium. The program is read at the program execution time by the control section 11 or a memory controller and is copied into the storage section 12 for use. The disk unit section 16 retains various pieces of information in accordance with a command input from the control section 11. The disk unit section 16 itself is a computer-readable storage medium.

The specific description of the processing performed by the control section 11 is given below: The processing of the control section 11 basically is divided into the following four stages: Processing of determining the retrieval target colors from input document data (retrieval target color determination processing), processing of retrieving a set of colors easily confused by people with color blindness (retrieval processing), processing of determining the adjustment target color of the colors contained in the retrieved color set (process color determination processing), and processing of actually performing predetermined adjustment processing for the adjustment target color and outputting the result (adjustment processing). The four types of processing will be discussed in order.

Before performing the described processing, the control section 11 stores the document data input through the external interface section 15 in the storage section 12. In the description that follows, the document data may be image data in JPEG (Joint Picture Experts Group) format, etc., or may be data created by application software such as PowerPoint® of Microsoft or Acrobat® of Adobe if the data is data that can be processed by the control section 11.

The control section 11 divides the document data for each area of used color. Specifically, if the document data is image data, a widely known method can be used. For example, a method described in the chapter of "Region Segmentation" on page 689 and the following pages of "Image Analysis Handbook" issued by Tokyo University Shuppankai, first edition on Jan. 17, 1991, edited by TAKAGI Mikio et al. can be used, and the methods will not be discussed in detail here.

If the document data is data created by application software, it is divided for each area in accordance with the data structure. For example, if the application software is Acrobat® of Adobe, internal data has a data structure containing a succession of information defining pattern elements shown in a display image like PostScript®. Then, a command such as a pattern filling command "fill" or a color defining command "setrgbcolor" may be found for each pattern element and the used color and the area occupied by the pattern element filled in the color on the display image may be determined for region segmentation.

Specifically, for each of the areas filled in different colors, the control section 11 generates area information containing information for determining the area (area determination information), at least one piece of coordinate information representing the contour of the area (contour determination information), and information of the color in the area (color determination information, for example, RGB value, etc.,), and stores the generated area information in the storage section 12. The control section 11 references the area information and determines information representing an area occupying a given range when a display image is generated based on the document data as to whether or not the area has a predetermined reference area or larger, whether or not the area is continuous in a predetermined length or more, etc. For example, if the data is image data, whether or not the area has a predetermined reference area or larger may be determined as a histogram for each color is calculated and whether or not the frequency exceeds a predetermined threshold value is determined. If the data is data created by application software, a display image may be once generated and then a histogram for each color on the display image may be calculated and whether or not the frequency exceeds a predetermined threshold value may be determined for determining whether or not the area has a predetermined reference area or larger. In the case as with PostScript (registered trademark), the area of a pattern element may be calculated using the coordinate information concerning the pattern element, contained in the document data and whether or not the area exceeds a predetermined threshold value may be determined for determining whether or not the area has a predetermined reference area or larger.

The control section 11 stores a set of the color information contained in the determined area information in the storage section 12 as determined color group information.

Next, the control section 11 references the determined color group information stored in the storage section 12, retrieves color information determined to represent confusion colors in association with color blindness of human beings in the color information contained in the determined color group, and generates at least one set of confusion color information (confusion color set). However, if confusion colors do not exist, a confusion color set is not generated and the subsequent processing is skipped. As a specific technique of the retrieval processing, a method using confusion color loci and a method using confusion color blocks are available and therefore will be discussed below separately. In the actual processing, preferably the user can select the former or latter method to perform the retrieval processing.

To begin with, the method using confusion color loci will be discussed. The confusion color locus is a confusion color line, etc., defined on the color component space (xy space) of CIE XYZ color system xy chromaticity diagram, and is points, a line, a plane, etc., defined so as to contain confusion colors in color blindness in a predetermined color component space. In the description that follows, a confusion color locus defined in the color component space (x, y space) corresponding to the xy chromaticity diagram is used for easy understanding. The confusion color locus becomes a confusion color line, as described above.

Figure 2A:
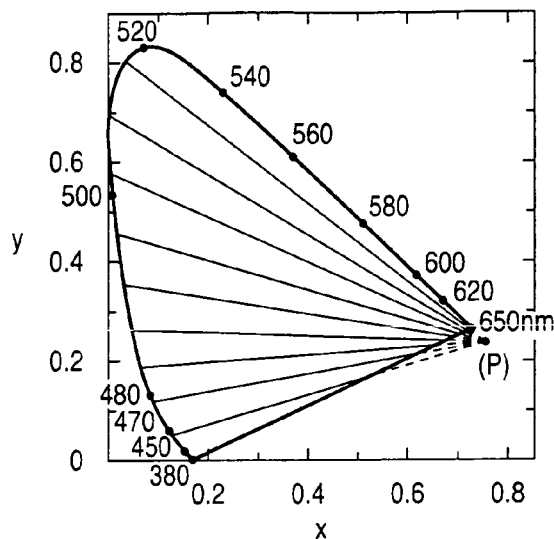
FIGS. 2A to 2C are schematic representations to represent examples of confusion color loci.
Figure 2B:
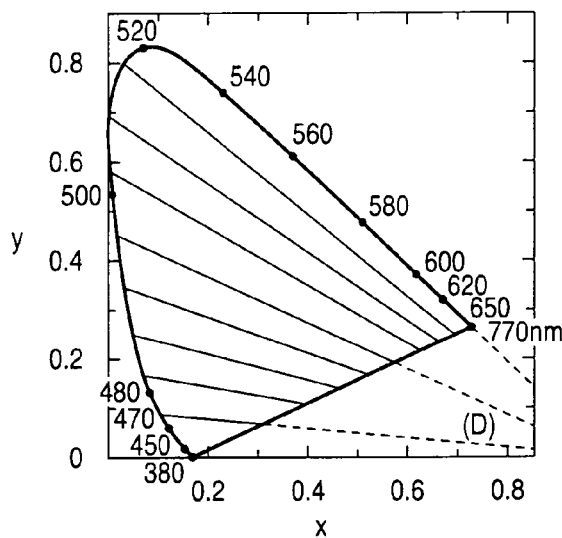
Figure 2C:
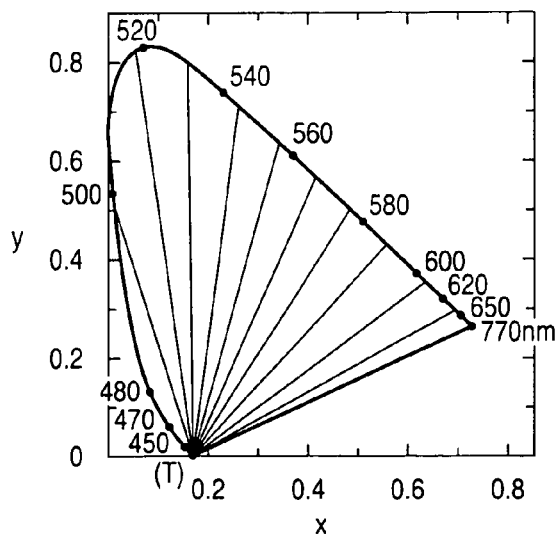

As already described, the confusion color line is each of lines drawn radially from each of intersection points O at different positions corresponding to the three types of color blindness P, D, and T in the x, y color component space as shown in FIGS. 2A to 2C, and an infinite number of lines can be drawn essentially. Therefore, it can be said that the confusion color line is one of lines in a group of an infinite number of lines (confusion color locus group in the invention).

The control section 11 converts the color information contained in the determined color group stored in the storage section 12 into color information represented in a color component space wherein a confusion color locus group can be defined, such as component (x, y) in the x, y color component space as in the example. Specifically, if the color information contained in the determined color group is represented in RGB, it is converted into x, y values. This conversion method is widely known and therefore will not be discussed again here.

The control section 11 selects one piece of color information (attention color information) according to a predetermined rule (for example, the storage order in the storage section 12 or the like) from among the color information contained in the determined color group. Further, the control section 11 performs the following processing for any other color information than the attention color information: The control section 11 selects color information C2 to be compared with attention color information C1 from among the pieces of other color information than the attention color information, and finds midpoint coordinates P (Xc, Yc) between C1 and C2. Then, the control section 11 generates parameters (for example, gradient and intersection point coordinates with the y axis) of an expression representing the line produced by connecting the midpoint coordinates P and the coordinates of intersection point O (Xo, Yo).

Next, the control section 11 finds distance d between the line defined by the parameters (corresponding to one attention confusion color locus in the confusion color locus group) and the attention color information C1 (or the attention color information C2 to be compared) (the distance from C1 and that from C2 become the same, d) and checks whether or not the distance d is less than a predetermined threshold value w. If d<w, the control section 11 assumes that C1 and C2 are confusion colors, and generates a confusion color set of C1 and C2 and then stores the confusion color set in the storage section 12.

The control section 11 further checks whether or not any other color information than the attention color information, not selected as the color information to be compared is contained in the determined color group. If any other color information is contained, the control section 11 selects it as the next color information to be compared, and repeats the above-described processing starting at the step of finding the midpoint coordinates P. If any other color information than the attention color information, not selected as the color information to be compared is not contained in the determined color group, the control section 11 completes the processing for the color information C1, deletes the color information C1 from the determined color group stored in the storage section 12, selects another piece of attention color information, and repeats the processing. The control section 11 repeats the processing until the number of color information pieces contained in the determined color group reaches one.

Figure 3:
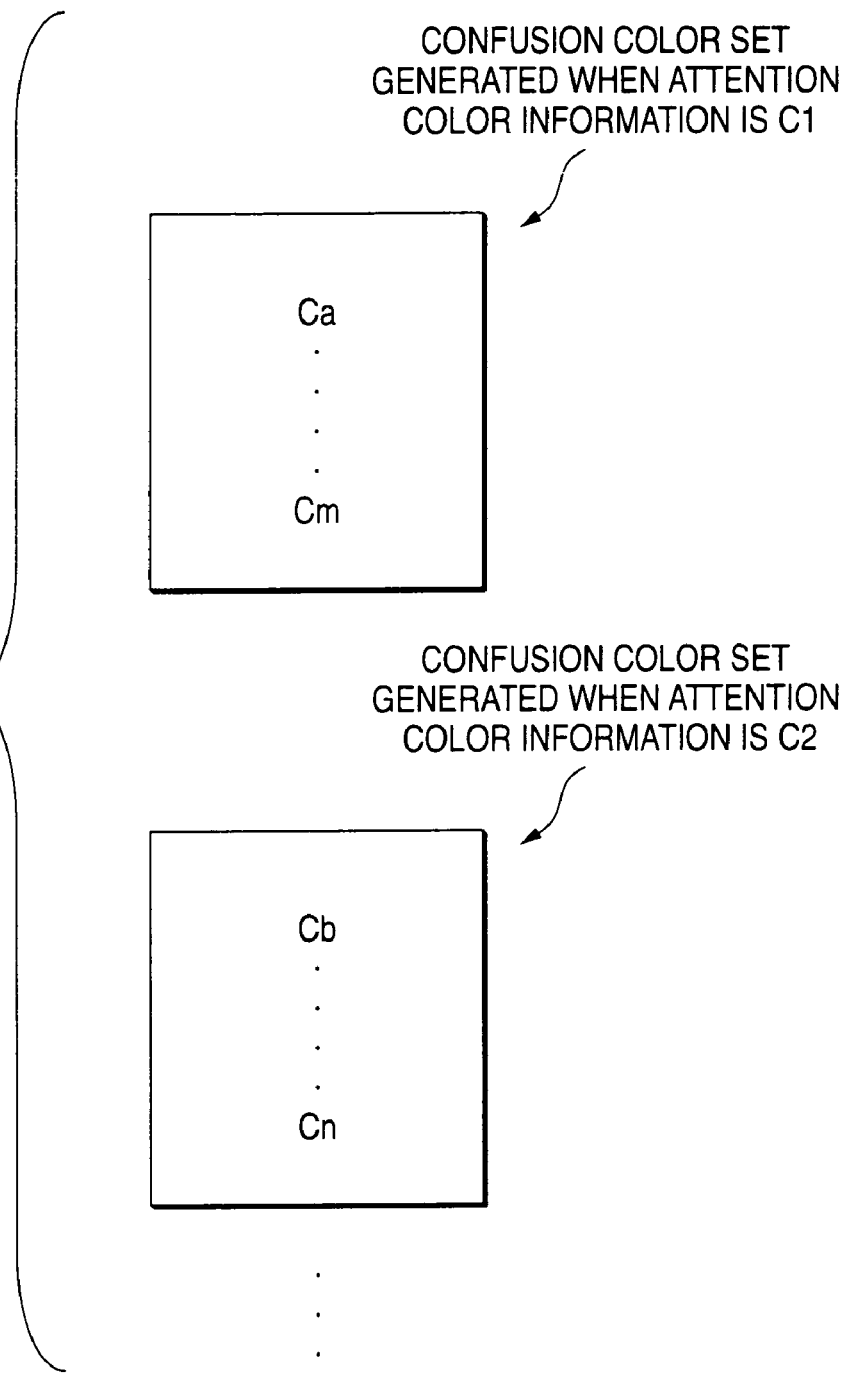
FIG. 3 is a schematic representation to represent examples of confusion color sets.

Then, when color information contained in the determined color group is adopted as attention color information, a confusion color set of the attention color information and its confusion color information is generated in the storage section 12, for example, as shown in FIG. 3.

Figure 4A:
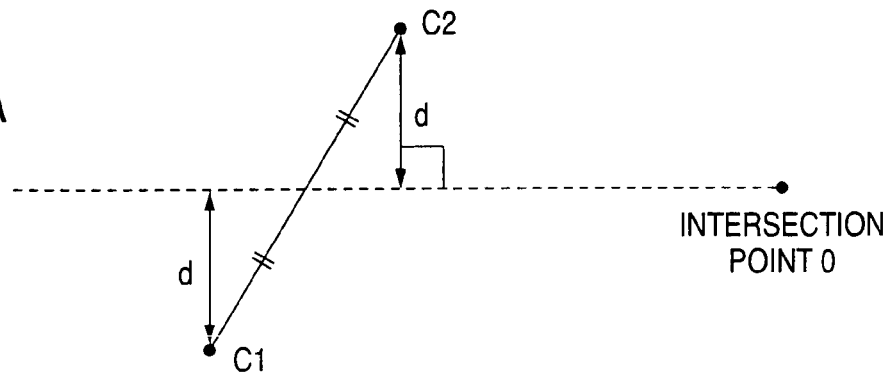
FIGS. 4A to 4D are schematic representations to represent an outline of retrieval processing.
Figure 4B:
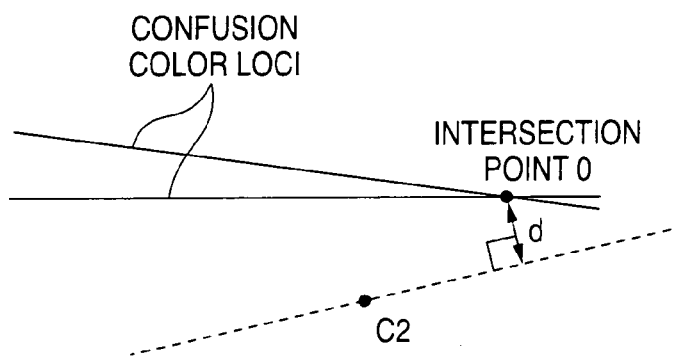
Figure 4C:
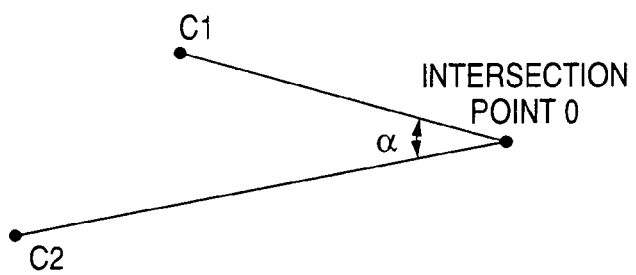
Figure 4D:
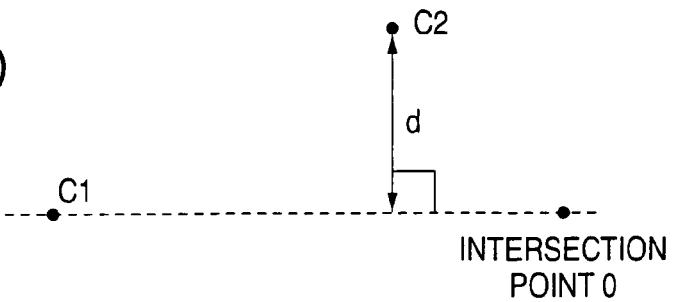

Here, the midpoint of the coordinates of the two color information pieces to be compared and the intersection point coordinates are used as shown in FIG. 4A, but the method using confusion color loci is not limited to it. For example, as shown in FIG. 4B, distance d between the line connecting the coordinates of color information C1 and color information C2 to be compared and the intersection point O may be calculated and whether or not the colors are confusion colors may be determined depending on whether or not the distance d is less than a predetermined threshold value. As shown in FIG. 4C, whether or not the colors are confusion colors may be determined depending on whether or not angle α between the two lines connecting the coordinates of color information C1 and color information C2 to be compared and the intersection point O is less than a predetermined threshold value. Further, as shown in FIG. 4D, whether or not the colors are confusion colors may be determined depending on whether or not distance d between the line connecting the coordinates of one of color information C1 and color information C2 to be compared and the intersection point O and the coordinates of the other is less than a predetermined threshold value. In this case, preferably C1 or C2, whichever is the more distant from the intersection point O, is Cf and the other is Cn and the distance d between the line connecting Cf and O and Cn is calculated so as to determine the gradient of the line (the line in FIG. 4D becomes a confusion color locus because it is a line passing through the intersection point O) precisely as much as possible.

In doing so, color information pieces in a predetermined range (range defined by each threshold value mentioned above) in the proximity of one confusion color locus although they are not on one confusion color locus strictly are stored as confusion color information and thus the color information pieces having a high probability of being confusion color information pieces is processed as described later for conversion to distinguishable form between them. That is, color confusion actually caused by two colors not necessarily existing on a confusion color line is also considered.

In the description made so far, it is assumed that the color represented by color information, namely, the color represented at one point on the xy space, for example, is confused with a color in the confusion locus direction. In fact, however, there are confusion colors not in the confusion locus direction because of the color vision characteristics of a human being. Specifically, it is known that if one of the colors contained in the determined color group is selected, the colors contained in a given range centering on the selected color are confused with the selected color regardless of whether or not the observer has color blindness. Such a color range is examined in detail by David MacAdam and the outer shape of the color range can be defined by an ellipse and therefore it is called MacAdam ellipse. The MacAdam ellipse is described in detail on pages 115 to 121 of "Color Engineering" written by OOTA Noboru, Tokyo Denki University Shuppankyoku, first edition issued on Dec. 20, 1993 (mentioned above) and therefore will not be discussed here in detail.

Then, the control section 11 may be a section for performing the following processing considering the MacAdam ellipse: The control section 11 converts color information contained in the determined color group into values in a predetermined color component space (for example, x, y coordinate values) and then generates parameters for defining a MacAdam ellipse (center coordinates (namely, coordinates of one color in the determined color group), length of long axis, length of short axis, gradient of ellipse, etc.,) for each color information piece and stores the parameters in the storage section 12. To derive the MacAdam ellipse, for example, an ellipse may be defined using a UCS diagram (uniform-chromaticity-scale diagram) capable of defining an ellipse as an equivalent to a small extent, for example, and then the ellipse on the UCS diagram may be converted into x, y coordinates to find the MacAdam ellipse, or each color information piece in the determined color group may be previously converted into coordinates on the UCS diagram (u, v), (u', v'), etc., (refer to pages 118 to 120 of "Color Engineering" mentioned above). To previously convert each color information piece in the determined color group into the UCS diagram space as in the latter case, a confusion color locus defined on the UCS diagram space is used.

The control section 11 generates parameter information determining MacAdam ellipses EC1, . . . , ECn defined for color information pieces C1, . . . , Cn contained in the determined color group, and stores the parameter information in the storage section 12. The areas on the color component space represented by the MacAdam ellipses correspond to nearby confusion areas obtained using the color vision characteristics of a human being and the like. The control section 11 calculates the expression of a tangent drawn on each MacAdam ellipse from the intersection point O of confusion color loci (confusion locus tangent to each MacAdam ellipse) and stores parameters defining the expression of the tangent (gradient, intersection point coordinates with the y axis, and the like) in the storage section 12. Two tangents are drawn from one intersection point for one MacAdam ellipse, as shown in FIG. 5A. In the description that follows, the MacAdam ellipse defined for color information Ck is represented as CEk and two tangents drawn for the MacAdam ellipse CEk are represented as Lka and Lkb.

The control section 11 calculates angles αka and αkb between reference line L0 drawn in the direction beyond the visible light range from the intersection point and two tangents Lka and Lkb for each color information piece, as shown in FIG. 5B. The control section 11 finds αma and αmb (where m≠k) existing between αka and αkb in a predetermined order for Ck=C1, . . . , Cn. If αma and αmb are found, the colors represented by the color information Ck and the color information Cm are assumed to be confused with each other, and the color information pieces are contained in the same confusion color set. Specifically, in FIG. 5B, α2b is contained between α1a and α1b and C1 and C2 are assumed to be color information representing confusion colors and are contained in the same confusion color set. On the other hand, none of a1a to a2b is contained between a3a and a3b and therefore there is no color confused with the color represented by C3 and C3 is not contained in any confusion color set.

In short, if even a part of MacAdam ellipse CEm corresponding to different color information Cm is contained in the range formed by the tangents Lka and Lkb drawn from the intersection point O with respect to the MacAdam ellipse CEk corresponding to color information Ck, Ck and Cm are assumed to be color information representing confusion colors and are contained in the same confusion color set.

In addition, the following method is also available: If different color information Cm is contained in the range formed by the tangents Lka and Lkb drawn from the intersection point O with respect to the MacAdam ellipse CEk corresponding to color information Ck, Ck and Cm are assumed to be color information representing confusion colors and are contained in the same confusion color set. In this case, to enhance the precision, preferably Ck or Cm, whichever is the more distant from the intersection point O, is Cf and the other is Cn and whether or not Cn is contained in the range formed by the tangents Lfa and Lfb drawn from the intersection point O with respect to the MacAdam ellipse CEf corresponding to Cf is determined.

Figure 6A:
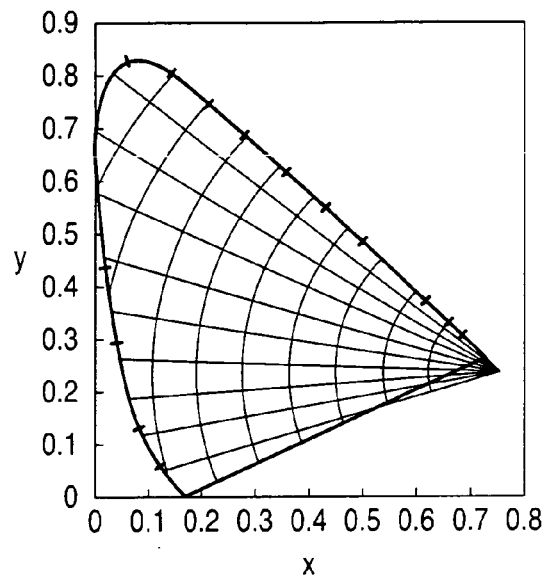
FIGS. 6A to 6D are schematic representations to represent examples of dividing color component space into blocks.
Figure 6B:
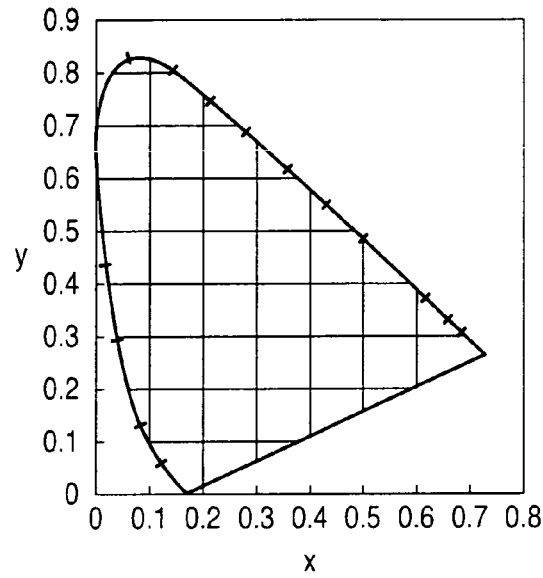
Figure 6C:
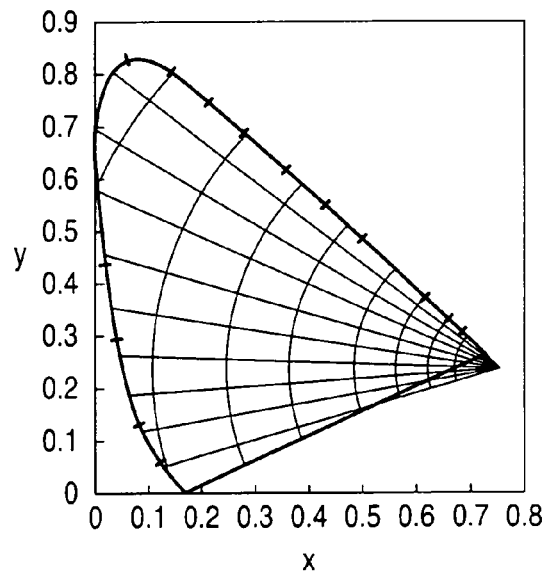
Figure 6D:
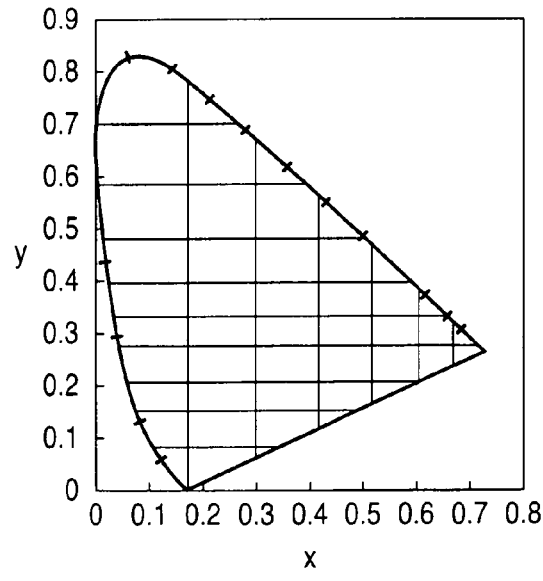

The retrieval processing of the control section 11 can also be realized according to the following method: In the example, in the storage section 12, at least the visible light range in a predetermined color component space (here, the space is assumed to be x, y space) is previously divided into blocks, as shown in FIG. 6A or 6B. Here, the space may be divided into blocks partitioned by lines drawn radially from the intersection point O corresponding to any of P, D, or T and concentric circles with the intersection point O as the center, for example, as shown in FIG. 6A, or may be divided into blocks partitioned by lines parallel to the x axis and the y axis, as shown in FIG. 6B. The space need not necessarily be divided into equal blocks. As the area of the MacAdam ellipse becomes larger (namely, the x value is smaller and the y value is larger), the block area may become larger, for example, as shown in FIGS. 6C and 6D.

Figure 7:
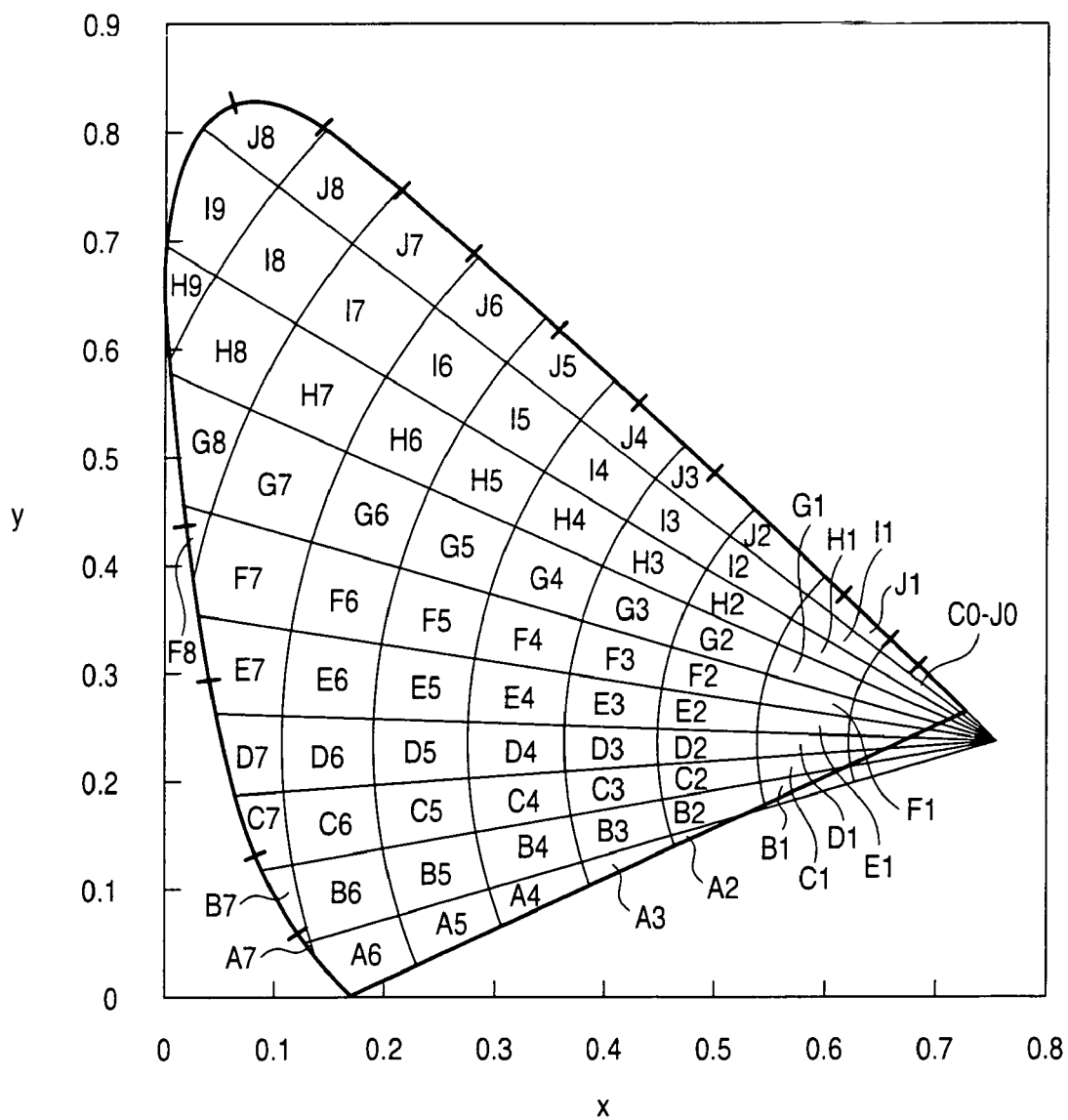
FIG. 7 is a schematic representation to represent an example of information determining blocks when color component space is divided into blocks.
Figure 8:
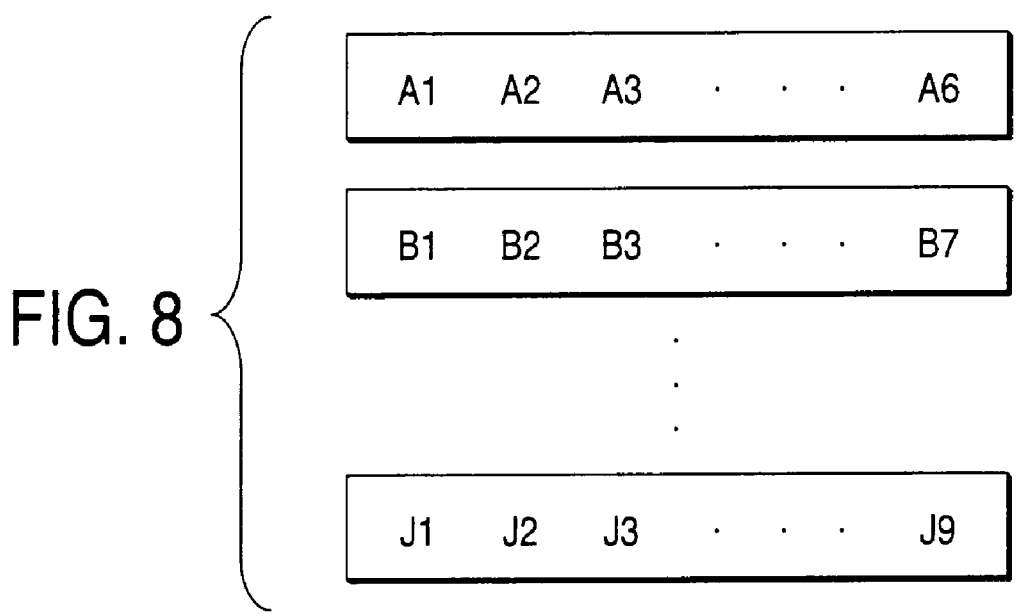
FIG. 8 is a schematic representation to represent an example of information associating blocks with each other.

Block association information for associating the provided blocks containing confusion colors with each other is stored in the storage section 12. Specifically, the block association information is as follows: If each block is assigned block identification information such as the identifier unique to the block as shown in FIG. 7, the block association information can be information associating the identification information pieces of the blocks containing confusion colors with each other (FIG. 8). FIG. 8 shows a state in which blocks having a common alphabetic part, such as J1 to J9, I1 to I9, . . . , A1 to A6 are associated with each other.

The blocks containing confusion colors may be the blocks along the confusion color locus or may be the attention block and the blocks surrounding the attention block. In the latter case, D2, E2, F2, D3, E3, F3, D4, E4, and F4 are associated with E3, for example, in FIG. 7.

Using the block setting information and the block association information, the control section 11 retrieves confusion colors as follows: Each color in the determined color group is converted into coordinate values on the color component space used to set blocks and which block each color belongs to is determined and then the result (block attachment information) is stored in the storage section 12. Each color contained in the determined color group is selected in order, the block to which the selected color belongs is adopted as the attention block, and the block association information is retrieved with the attention block as a key. The block associated with the attention block (containing the attention block itself) is determined and the block attachment information stored in the storage section 12 is checked to see if the color belonging to the determined block exists. If the color belonging to the determined block exists, the color and the selected color are contained as confusion colors in the same confusion color set for storage in the storage section 12.

For example, assume that the block to which the color represented by the color information C1 contained in the determined color group belongs is E3 and that the block association information stored in the storage section 12 contains information associating E1, E2, E3, . . . , E7 with each other. At this time, assuming that the color represented by different color information C2 contained in the determined color group belongs to the block E7, the attention block E3 and the block E7 are associated with each other according to the block association information and thus the color information C2 belonging to the block E7 is contained in the same confusion color set as the color information C1 for storage in the storage section 12.

Figure 9:
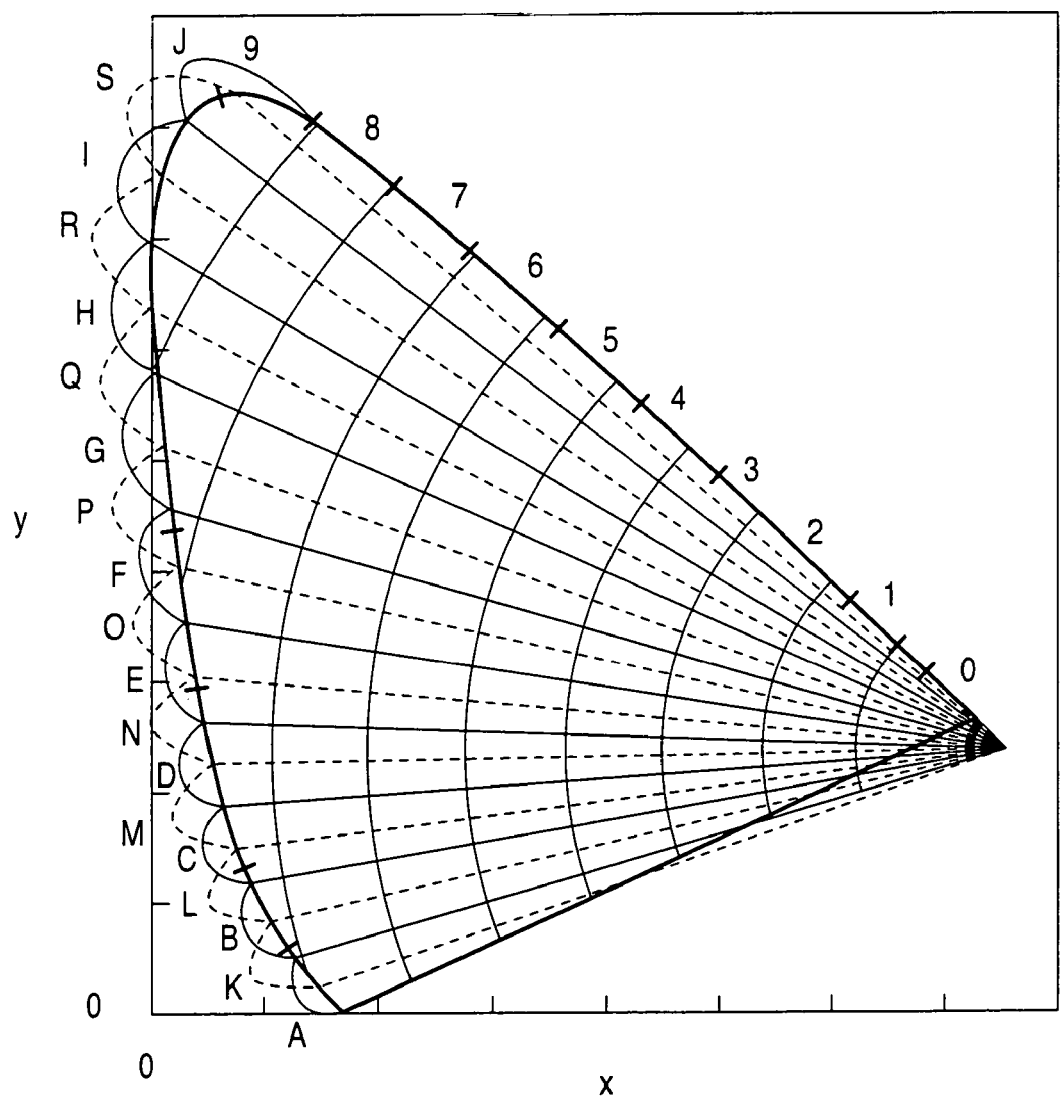
FIG. 9 is a schematic representation to represent an example of blocks defined while different blocks are superposed on the blocks.

Further, blocks may be set while different blocks are superposed on the blocks. For example, as shown in FIG. 9, for the blocks set in FIG. 6A, radial lines (indicated by dashed lines) with a half width may be set, and blocks partitioned by adjacent dashed lines and the concentric circles in FIG. 6A may be set together with the blocks in FIG. 6A. If the blocks are thus defined, the colors in the vicinity of the boundary can be processed precisely. In this case, each color may belong to two blocks (for example, in FIG. 9, point t belongs to both D5 block and N5 block); in such a case, the color is assumed to be confused with the color belonging to the block associated with either of the two blocks and the color information pieces representing the colors are contained in the same confusion color set for storage in the storage section 12.

As described so far taking examples, the control section 11 generates at least one confusion color set information about at least some of the colors used in the document data (color information contained in the determined color group) according to the method using confusion color locus information, the method of dividing the color component space into blocks, etc., and stores the information in the storage section 12. However, if confusion colors do not exist, a confusion color set is not generated and the following processing and the subsequent processing are skipped.

The control section 11 performs the processing for each intersection point for each of the color blindness types of P, D, and T and generates a confusion color set obtained as the processing is performed.

Alternatively, the processing may be performed only for the intersection point for at least one color blindness type selected from among P, D, and T through the operation section 13 or the external interface 15.

As previously described, even if two colors are on the same confusion color locus (confusion colors), if they differ in lightness, the person who has any color blindness type would be able to recognize them as different colors. Then, the control section 11 checks the lightness of each of two color information pieces of colors determined to be confusion colors and if they differ in lightness, the control section 11 does not contain them in the confusion color set. In doing so, the number of the color information pieces contained in the confusion color set is decreased, so that the later processing load is lessened.

In the retrieval processing, when attention color information is selected, color information representing a color different in lightness from the attention color information in the determined color group is excluded from the retrieval processing. That is, on the color vision characteristics of a human being, the colors different in lightness may be handled as colors not confused with each other without determining whether or not the colors are confused with each other. In doing so, the retrieval processing load is lessened.

Further, to use the confusion color loci as retrieval processing, the control section 11 may adopt the following technique: Since the intersection point for P and that for D are at comparatively near positions, an assumed intersection point is placed in the coordinates defined as the intermediate position between the coordinates of the intersection point for P and those for D, and the lines drawn radially from the assumed intersection point are used as confusion color loci. In doing so, the need for performing processing separately for P and D is eliminated, so that the processing load can be lessened.

The control section 11 references information of the confusion color set stored in the storage section 12 as the result of the retrieval processing described above and determines the color information for which the following adjustment processing is to be actually performed in the confusion color set (process target color). In fact, the control section 11 may perform the adjustment processing for all color information contained in the confusion color set.

However, the adjustment processing need not necessarily be performed for all color information in some cases. Then, the control section 11 retrieves the pattern minimizing the number of process target colors in process target color patterns (combinations of process target color information pieces such as processing pattern of only C1, processing pattern of C1 and C2, . . . for C1, C2, and C3), and determines the process target colors based on the pattern. As the process color determination processing is performed, the number of process target colors is reduced and the processing load is lessened. Specific color information of white, black, etc., is not adopted as the process target colors.

Figure 10A:
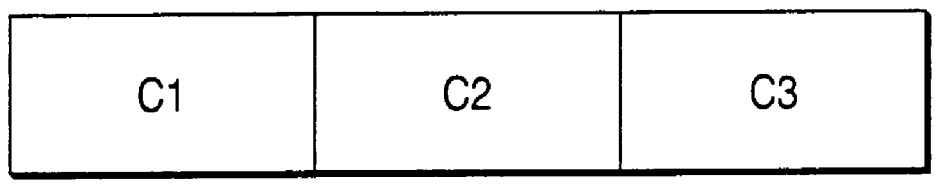
FIGS. 10A and 10B are schematic representations to represent examples of placement of color information.
Figure 10B:
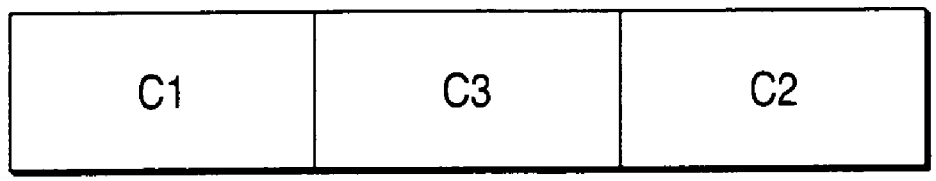

Specific examples of the process color determination processing will be discussed below: In the description that follows, a method of determining the process target colors based on how the areas represented by different colors on the document data are placed and a method of determining the process target colors based on the confusion color set state are taken as examples. In the actual processing, preferably the user can select the method from among the following methods to determine the process target colors:

The control section 11 can determine the process target colors based on the color placement on the document data. That is, if the confusion color set stored in the storage section 12 contains color information C1 and color information C2 and does not contain C3, area information containing the color information C1 and area information containing C2 on the document data are extracted and if the area of the color represented by C1 and the area of the color represented by C2 are placed adjacent to each other, as shown in FIG. 10A, at least either of C1 and C2 needs to be adopted as the process target color. However, if the area of the color represented by C1 and the area of the color represented by C2 on the document data are not adjacent to each other and the area of the color represented by C3 is placed there between as shown in FIG. 10B, C1 and C2 are separated in color by C3 and thus C1 and C2 need not necessarily be adopted as the process target colors.

Then, the control section 11 determines the process target colors based on the adjacent state of the colors contained in the same confusion color set on the document data. A specific example of processing of referencing the adjacent state is as follows:

The control section 11 performs the following processing for each of the confusion color sets. To begin with, one of the confusion color sets is adopted as the attention confusion color set and all color information contained in the attention confusion color set is temporarily determined the process target colors. The area information containing each piece of the color information contained in the temporary process target colors is retrieved from the area information stored in the storage section 12, the retrieved area information is adopted as attention area information, and the area information (adjacent area information) of the area adjacent to the area (attention area) corresponding to the attention area information is further retrieved.

The color information contained in the adjacent area information (if more than one piece, each adjacent area information piece) is referenced and whether or not the color information is contained in the attention confusion color set is checked. If no color information is contained in the attention confusion color set, the color information contained in the attention area information is removed from the temporary process target colors.

As such processing is performed repeatedly with each of the confusion color sets as the attention confusion color set in sequence, the process target colors are temporarily determined for each. The control section 11 determines that the color information contained in any of the temporary process target colors is the real process target color, and stores it in the storage section 12.

Accordingly, all color information confused with each other is once temporarily determined the process target colors and if the area adjacent to the area in which one of the temporary process target colors is used is not an area in which color information confused with the temporary process target color is used, the temporary process target color is removed from the process target colors. Therefore, only if the confusion colors are adjacent to each other and either of the confusion colors requires adjustment processing, the color becomes the process target color, so that the processing load is lessened.

In the process color determination processing, if processing as to whether or not the color information is removed from the temporary process target colors is skipped for the color once determined the real process target color, the processing efficiency is further improved.

The control section 11 can also perform the process color determination processing based on placement according to another method. That is, the control section 11 reserves an area for storing counters each corresponding to each of pieces of the area information generated by performing the retrieval target color determination processing and stored in the storage section 12 in the storage section 12, and initializes the values of the counters corresponding to the area information to 0.

Next, the control section 11 adopts one of the confusion color sets (or temporary sets described later) stored in the storage section 12 as the attention confusion color set and selects one piece of the color information contained in the attention confusion color set as selected color information. The control section 11 extracts the area information containing the selected color information from among the area information pieces stored in the storage section 12. If a plurality of pieces of the area information exists, the control section 11 extracts all the plurality of pieces of the area information.

Further, the control section 11 retrieves the area adjacent to the area corresponding to each of the extracted area information pieces and takes out the color information from the area information (adjacent area information) corresponding to the area obtained as the result of the retrieval. The control section 11 checks how many taken-out color information pieces are contained in the attention confusion color set, and adds the result to the counter corresponding to the area information as the number of adjacent confusion colors.

The control section 11 selects an unselected piece of the color information contained in the attention confusion color set and repeats the processing starting at extracting the area information. The control section 11 repeats the processing until all pieces of the color information have been selected.

Figures 11A, 11B:
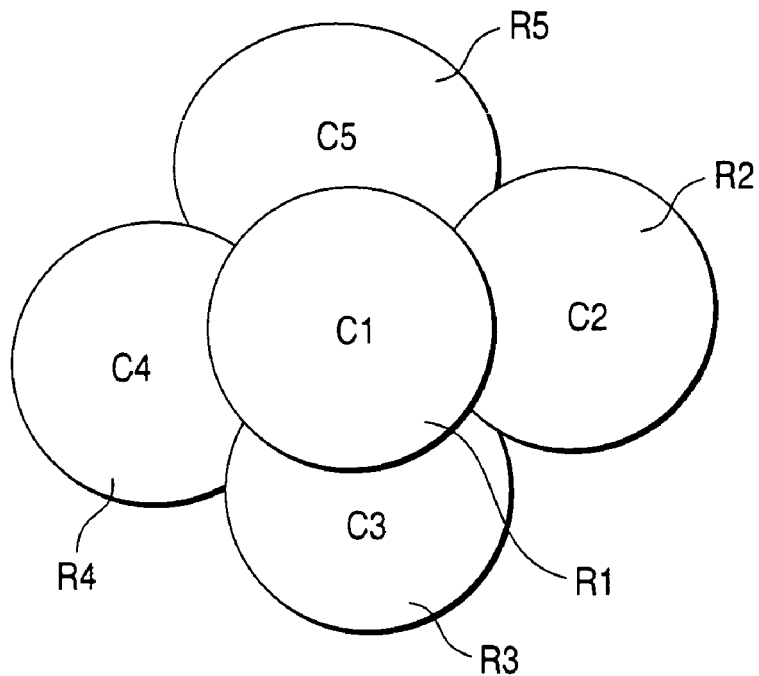
FIGS. 11A and 11B are schematic representations to represent another example of placement of color information and an example of process target color determination processing based thereon.

Here, for example, when areas R1 to R5 are created and the area information pieces corresponding to the areas R1 to R5 are color information pieces C1 to C5 as shown in FIG. 11A and the attention confusion color set contains C1, C2, and C4 and not C3 or C5, the state of each counter is illustrated as follows: When the area R1 (color information C1) in FIG. 11A is selected, the number of color information pieces C2 and C4 is counted in the four areas adjacent the area R1 (R2 to R5) and therefore the counter corresponding to the area R1 is set to 2. When the area R2, R4 with the color information C2, C4 is selected, the counter corresponding to the area R2, R4 is set to 1 because the number is counted only in the area R1 with the color information C1 in the adjacent areas. The counter corresponding to the area R3, R5 corresponding to the color information C3, C5 remains 0. (See FIG. 11B.)

The control section 11 further repeats the processing while adopting each confusion color set as the attention confusion color set in order until all of the confusion color sets stored in the storage section 12 have been adopted as the attention confusion color set. Consequently, for each area information piece, the number of confusion color areas in the surroundings of the area represented by the area information piece is retained in the storage section as the value of the corresponding counter.

The control section 11 selects the maximum value of the counters provided in a one-to-one correspondence with the area information pieces, references the color information of the area information corresponding to the selected counter value, determines the color information to be the process target color, and stores the process target color in the storage section 12. The control section 11 removes the color information from each confusion color set to generate a temporary confusion color set (temporary set), and repeats the processing of referencing the adjacent state. When every counter is set to 0, the control section 11 terminates the processing.

In the example shown in FIG. 11A, the value of the counter corresponding to the area R1 is 2, the maximum value, and therefore the color information C1 corresponding to the area R1 is adopted as the process target color and is removed from the confusion color set to generate a temporary set. The temporary set contains C2 and C4, but R2 and R4 are not adjacent. Thus, as the processing of referencing the adjacent state is repeated, every counter corresponding to the area information of the areas R1 to R5 remains 0. Therefore, the process target color becomes C1 only. Accordingly, the processing load can be decreased as compared with the case where processing is performed for both C1 and C2, for example.

The processing of referencing the adjacent state may be performed more simply in the following manner: A binary flag of "0" or "1" rather than the counter is used. The flag corresponding to the area information with the number of adjacent confusion colors becoming 1 or more is set to "1" and the color information contained in any piece of the area information with the flag set to "1" is selected by a predetermined method (for example, at random). The selected color information is determined the process target color and the process target color is stored in the storage section 12. In this case, the control section 11 removes the color information from each confusion color set to generate a temporary confusion color set (temporary set), and repeats the processing of referencing the adjacent state. When every flag is set to 0, the control section 11 terminates the processing.

Further, to use the flags in such a manner, the color information contained in each of all pieces of the area information with the flag set to "1" may be determined the process target color and the process target colors may be stored in the storage section 12. If the color information contained in each of all pieces of the area information is thus adopted as the process target color, the adjustment processing load cannot be decreased, but the process color determination processing load can be decreased.

As another example of the process color determination processing, the process target color may be generated based on the confusion color set state. This is based on the following fact: For example, when the first one of two confusion color sets generated by performing the retrieval processing contains colors C1 and C2 and the second confusion color set contains colors C1 and C3, if adjustment processing is performed so as to make the lightness of the color C1 different from the lightness of the color C2 and that of the color C3, it becomes unnecessary to perform adjustment processing for C2 and C3.

In this case, the control section 11 performs the following process color determination processing based on the confusion color set state for the confusion color sets (or temporary sets described later) stored in the storage section 12: One of the confusion color sets is selected, counters each corresponding to each of pieces of the color information contained in the selected confusion color set are reserved in the storage section 12, and the values of the counters are set to 1.

Next, one of the unselected confusion color sets is selected. If the counter corresponding to each piece of the color information contained in the selected confusion color set is stored in the storage section 12, the counter is incremented; if not stored, a new counter corresponding to the color information is set in the storage section 12 and the value of the counter is set to 1.

The processing is repeated starting at selecting one of the unselected confusion color sets until all confusion color sets have been selected. Then, for each piece of the color information contained in any confusion color set, frequency information indicating the number of confusion color sets in which the color information piece is contained is obtained. Thus, the control section 11 determines that the color information piece with the largest frequency (if more than one color information piece with the largest frequency exists, one of them) is the process target color, and stores it in the storage section 12.

The control section 11 removes the color information determined the process target color from each confusion color set to generate a set, and repeats the process color determination processing based on the confusion color set state until the number of color information pieces contained in the temporary set becomes one or less.

Thus, the color information piece contained in two or more confusion color sets becomes preferentially the process target color.

Next, adjustment processing of the process target color determined by performing the process color determination processing to a state in which people with color blindness can distinguish the color from any other color will be discussed. Specifically, the control section 11 changes the position of the process target color on the color component space such as lightness, chroma, or tint or performs processing using a pattern such as superposing a pattern defined for each color or replacing color with a pattern with respect to the area in which the process target color is contained.

An example of changing the position on the color component space and an example of using a pattern will be discussed as examples of the adjustment processing. In the actual processing, preferably the user can select any of the following processing examples to be used to perform the adjustment processing:

As previously described, even if two colors are on a single confusion color locus, if they differ in lightness, the colors can distinguished from each other. Then, the control section 11 changes information of lightness about the color information determined to be the process target color. The value of the lightness after change may be determined as follows: In the description that follows, it is assumed that each color information piece contained in a confusion color set has the lightness near to a predetermined range (namely, the processing of making efficient using lightness previously described is performed).

Different lightness information pieces for making it possible to distinguish colors from each other on the color vision characteristics of a human being are previously stored in the storage section 12 as model lightness information. One color information piece with the lightness to be changed is selected from the target process color, the current lightness of the color information piece with the lightness to be changed is referenced, one is selected from among the model lightness information pieces stored in the storage section 12 according to a predetermined method (for example, at random or the lightness information piece nearest to the current lightness, second nearest to the current lightness, or most distant from the current lightness), the lightness information of the color information piece with the lightness to be changed is changed to the selected lightness information, and the selected lightness information is stored as "already used." To change the lightness of the color information piece contained in the same confusion color set according to the above-described method, the control section 11 selects one lightness information piece according to the predetermined method from among the model lightness information pieces other than "already used," changes the lightness information of the color information piece with the lightness to be changed to the selected lightness information, and stores the selected lightness information as "already used."

To consider the color information piece removed from the confusion color set because of different lightness when the processing of making efficient using lightness is performed, preferably the model lightness information piece nearest to the lightness information of the removed color information piece is previously stored as "already used."

Accordingly, adjustment is made so that the color information pieces contained in the same confusion color set have different lightness (namely, in different adjustment amounts).

If the confusion color set contains two color information pieces, preferably adjustment is made so that one becomes light (high lightness or high brightness) and the other becomes dark (low lightness or low brightness). To do this, when one of the model lightness information pieces is selected, lightness larger than the current lightness can be selected for one and lightness smaller than the current lightness can be selected for the other.

Further, the component of chroma rather than the lightness may be converted. Also in this case, the chroma is adjusted so that the colors contained in the same confusion color set become different in adjustment amount. If the same confusion color set contains two color information pieces, adjustment can also be made so that one becomes high chroma and the other becomes low chroma in a similar manner.

Further, for the tint component, the tint is adjusted so that the colors contained in the same confusion color set become different in adjustment amount. If the same confusion color set contains two color information pieces, one is adjusted in a plus direction (clockwise) and the other is adjusted in a minus direction (counterclockwise).

Here, examples of making adjustment in the color component space based on lightness, chroma, and tint have been shown, but adjustment may be made in the x, y color component space. In this case, for example, the component of at least one piece of the color information contained in the same confusion color set is adjusted in the direction of the normal to the confusion color locus on which the confusion color set is based. A part of each color information piece after adjustment must be prevented from entering a predetermined range near another confusion color locus in such a manner that two of the color information pieces contained in the same confusion color set are adjusted in the opposite directions relative to the normal direction.

To adjust the lightness, etc., the color information must be once converted into the color component space containing the color component to be adjusted. However, another color component space maybe preferable in the later processing. Then, before adjusting the lightness, etc., the control section 11 converts the color information into the values in the color component space containing the color component to be adjusted and after adjusting the color component, the control section 11 inversely converts the color information after the adjustment into the values in the former color component space. If a more suitable color component space exists at the later stage of processing, the color information after the adjustment may be converted into the suitable color component space.

The control section 11 may perform the adjustment processing using patterns. In this case, a plurality of pieces of pattern information are previously stored in the storage section 12 and processing is performed using different pattern information pieces for the process target colors. Hatching, a repetitive pattern, and the like are included as examples of the pattern information.

Processing examples using pattern information will be discussed below:

The control section 11 associates different pattern information pieces with the color information pieces of the process target colors. Next, the control section 11 replaces the portion of the color information piece of the process target color with the pattern indicated in the pattern information piece associated with the color information piece.

Further, in this case, the pattern information is associated with the color information so that the pattern information pieces also become darker in the order as the color information pieces become darker. Accordingly, as the color information piece of the process target color becomes darker, the pattern information piece replacing the color information piece becomes darker, so that visual impression is maintained to some extent.

The control section 11 may superpose a pattern on the portion of the color information piece of the process target color rather than replacing with a pattern. In this case, the corresponding pattern is placed on the color information piece of the process target color. Also in this case, the pattern information is associated with the color information so that the pattern information pieces also become darker in the order as the color information pieces become darker, whereby visual impression is maintained to some extent.

Further, to superpose the pattern in such a manner, the superposition ratio is changed in response to the color depth of the color information piece of the process target color, whereby visual impression can be kept to some extent. To do this, for example, a table of associating the superposition ratio with each color information piece used with document data may be referenced.

Further, to superpose pattern information, the control section 11 may superpose pattern information on at least one of the color components of lightness, chroma, tint, R, G, B, etc., of the color information of the process target color.

Further, the control section 11 may store the color information provided after the adjustment in the storage section 12 or the disk unit section 16 in association with the original color information. The retained information is used in the later input document data. In this case, in the later input document data, if additional adjustment is made to color information not contained in the retained information, preferably the color information and the color information provided after the adjustment are stored in association with each other in addition to the retained information. Accordingly, in the state as if the processing result were cached, the processing load can be decreased.

Such cached information is retained at least for a given time period, whereby uniform adjustment is made to the color information contained in the successively input document data, so that similar adjustment is made to a series of materials used with a presentation, for example, and visibility is enhanced.

Further, the color information piece about each representative color, of the color information used in the document data may be previously stored in the storage section 12 or the disk unit section 16 as model information in association with the color information provided after adjustment, and the control section 11 may use the stored model information in adjustment processing.

In the description made so far, the color component space to retrieve a confusion color set is the two-dimensional x, y space, but a three-dimensional color component space provided by adding lightness or brightness is added to the two-dimensional x, y space may be used. Further, an N-dimensional space including any other color component may be used.

Figure 12:
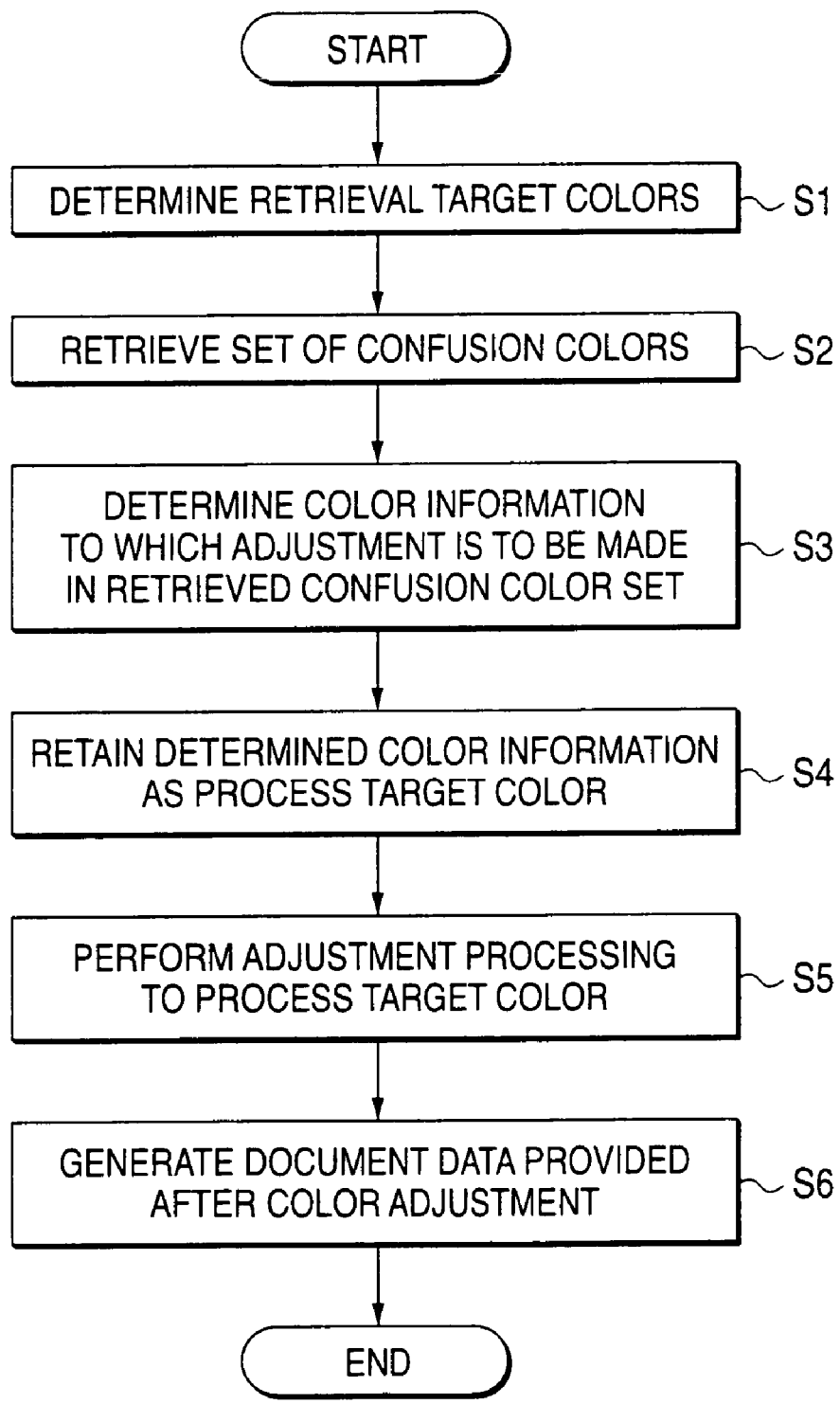
FIG. 12 is a flowchart to represent an example of the general processing flow of the document processing apparatus according to the embodiment of the invention.

The operation of the document processing apparatus according to the embodiment of the invention is summarized as follows: As shown in FIG. 12, the document processing apparatus according to the embodiment determines the colors to which confusion color retrieval processing is applied from the input document data (S1; retrieval target color determination processing) and then retrieves a set of colors confused by people with color blindness from the retrieval target colors (S2; retrieval processing). The document processing apparatus determines color information to which adjustment is to be made among the colors contained in the retrieved color set (S3; process color determination processing) and stores the color information of the process target color in the storage section 12 (S4).

Further, the document processing apparatus adjusts the color component of the process target color stored in the storage section 12 at step S4 and/or performs processing using a pattern such as superposing a pattern (S5; adjustment processing), generates document data provided after the color information is adjusted (S6), and stores the generated document data in the storage section 12 and then terminates the processing.

At step S4, the color information of the process target color may be retained in association with the input document data and to generate a display image based on the document data (namely, to display the document data on the display section 14, project the document data with a projector, or transmit the document data to an external system through the external interface 15), step S5 and the later steps may be executed. In such an example, the color information of the process target color may be retained in a Web server together with an HTML document and image data and may be transmitted together with the HTML document, etc., in response to a command from the browser of the user and in the browser, step S5 and the later steps may be executed for displaying the HTML document and image data. In such a case, for example, the process target colors may be classified for each type of color blindness P, D, T and any process target color may be selectively transmitted in response to the circumstances of the user. At step S6, the document data provided after the adjustment is generated, but color adjustment processing may be performed to the data of a display image provided from the document data.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A document processing apparatus comprising:
    a determination unit that determines at least some of a plurality of colors contained in input document data as a determined color group;
    a retrieval unit that calculates an angle between (i) a line, in a given color component space, connecting a given point, which is defined in connection with color blindness of a human being, and one of the colors of the determined color group and (ii) a line, in the given color component space, connecting the given point and each of the other colors of the determined color group, and determines as to whether or not each calculated angle is less than a given threshold value, wherein if the retrieval unit determines that one calculated angle is less than the given threshold value, the retrieval unit determines said one of the colors and said other of the colors, which corresponds to the one calculated angle, as a confusion color set; and
    a processor that performs a given process for portions, each having any of the colors contained in the confusion color set determined by the retrieval unit, in the input document data.

2. The document processing apparatus according to claim 1, wherein
    the given color component space contains a lightness component of each of the colors in the determined color group; and
    the retrieval unit removes an attention color from the confusion color set when the attention color contained in the confusion color set and other one or more colors contained in the confusion color set differ in lightness on color vision characteristics of a human being.

3. The document processing apparatus according to claim 1, wherein
    the given color component space contains a lightness component of each of the colors in the determined color group; and
    the retrieval unit does not determine whether or not colors of the confusion color set differ in lightness on color vision characteristics of a human being are confused with each other.

4. The document processing apparatus according to claim 1, wherein
    the determination unit determines as to whether or not each area filled with any of the plurality of colors contained in the input document data has a given reference area based on a histogram of the colors.

5. A document processing apparatus comprising:
a determination unit that determines at least some of a plurality of colors contained in input document data as a determined color group;
a retrieval unit that defines a nearby confusion area in a given color component space, for each of the colors contained in the determined color group, based on at least one of color vision characteristics of a human being and characteristics of an output medium, wherein
a confusion color locus group is defined so that each of confusion color loci of the confusion color locus group contains colors that are confused by a person having color blindness, and
when one attention confusion color locus included in the confusion color locus group passes through insides of some of the nearby confusion areas, the retrieval unit determines colors contained in the some of the nearby confusion area as a confusion color set.

6. A document processing apparatus comprising:
a determination unit that determines at least some of a plurality of colors contained in input document data as a determined color group;
a retrieval unit that defines a nearby confusion area in a given color component space, for each of the colors contained in the determined color group, based on at least one of color vision characteristics of a human being and characteristics of an output medium, wherein
a confusion color locus group is defined so that each of confusion color loci of the confusion color locus group contains colors that are confused by a person having color blindness, and
when one attention confusion color locus included in the confusion color locus group passes through insides of some of the nearby confusion areas, the retrieval unit determines colors, which are contained in the some of the nearby confusion area and a color in a proximity of an attention confusion color locus, as a confusion color set; and
a processor that performs a predetermined process for portions of the colors contained in the confusion color set determined by the retrieval unit in the input document data.

7. A document processing apparatus comprising:
a determination unit that determines at least some of a plurality of colors contained in input document data as a determined color group;
a retrieval unit, wherein
blocks are previously defined in a given color component space,
the retrieval unit determines which block each of the colors contained in the determined color group belongs to, and
the retrieval unit determines some of the colors contained in the determined color group as confusion color set based on block confusion color information associating blocks confused with each other under color blindness of a human being and information indicating the block to which each of the colors contained in the determined color group belongs; and
a processor that performs a predetermined process for portions of the colors contained in the confusion color set determined by the retrieval unit in the input document data.

8. A document processing method using a computer to process color contained in a document, comprising:
determining at least some of a plurality of colors of an area contained in input document data as a determined color group;
calculating an angle between (i) a line, in a given color component space, connecting a given point, which is defined in connection with color blindness of a human being, and one of the colors of the determined color group, and (ii) a line, in the given color component space, connecting the given point and each of the other colors of the determined color group;
determining whether each calculated angle is less than a given threshold value, wherein if one calculated angle is less than the given threshold value, determining said one of the colors and said other of the colors, which corresponds to the one calculated angle, as a confusion color set; and
performing a given process for portions, each having any of the colors in the confusion color set in the input document data.

* * * * *